United States Patent Office 3,492,096
Patented Jan. 27, 1970

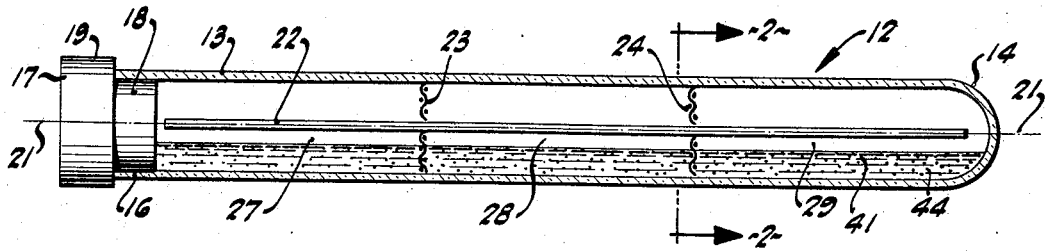
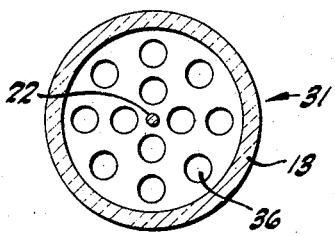
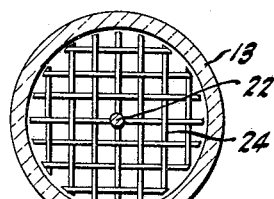
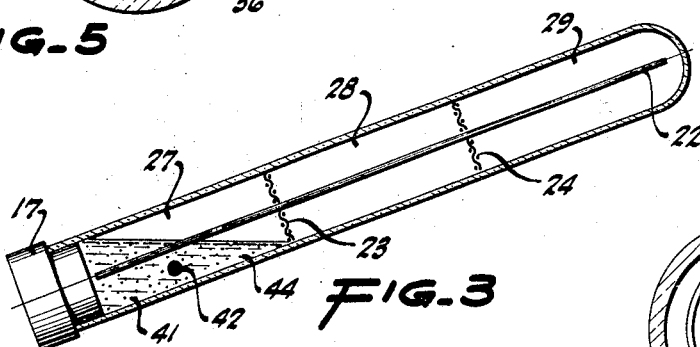
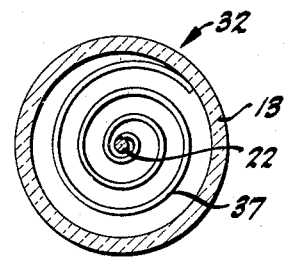
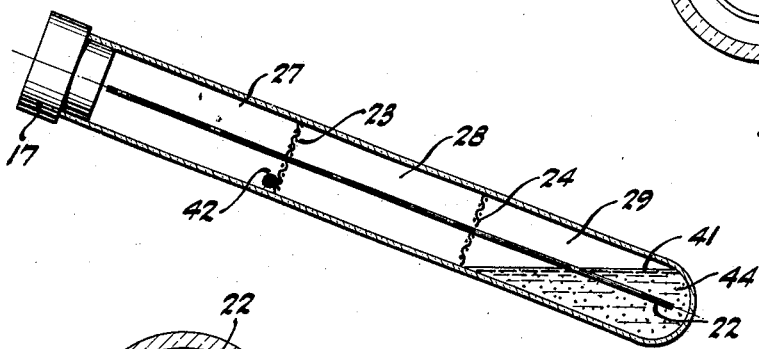
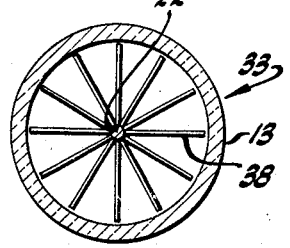

3,492,096
APPARATUS FOR AND METHOD OF DETECTING THE COAGULATION OF WHOLE BLOOD
Paul G. Hattersley, 2315 Stockton Blvd., Sacramento, Calif. 95817
Filed Oct. 5, 1967, Ser. No. 678,144
Int. Cl. G01n 33/16
U.S. Cl. 23—230        9 Claims

ABSTRACT OF THE DISCLOSURE

A foraminous member located intermediate the ends of a transparent vessel, such as a test tube, affords a lodgment for even a very small blood clot forming in a sample of freshly drawn blood as the blood placed in the vessel is tilted from end to end. By timing the appearance of the first clot lodged on the foraminous member, the activated coagulation time of a patient's whole blood can be accurately determined, thereby affording a valuable means of detecting hemorrhagic diatheses.

---

The invention relates generally to devices for detecting a change from a liquid to a solid state and, more particularly, to improvements in determining the activated coagulation time of whole blood.

As indicated in my papers entitled "The Treatment of Classical Hemophilia With Cryoprecipitates" and "Activated Coagulation Time of Whole Blood" appearing respectively in The Journal of the American Medical Association, on Oct. 17, 1966, vol. 198, pp. 243–247, and on May 2, 1966, vol. 196, pp. 436–440, the determination of the coagulation time of whole blood, as previously performed, has failed to provide an adequately sensitive means of detecting hemorrhagic diatheses, i.e., a constitutional tendency to spontaneous often severe bleeding.

In the May 2, 1966, paper, there is described a new technique developed by me, including drawing venous blood directly into a test tube containing a small amount of diatomaceous earth, or other particulate material, such as kaolin, to effect quick maximal contact activation of plasma, followed by timing the appearance of the first blood clot, the process being carried out under controlled conditions of temperature. This technique has proved to be a simple, reliable and reasonably sensitive bedside test of the coagulation mechanism.

In the new technique so described, however, a source of error existed by reason of the difficulty in observing the appearance of the first clot. In other words, as a small quantity of blood introduced into a test tube is spread along the bottom of the tube, even a most painstaking and careful observation sometimes fails to show the existence of the first clot. Being of the same color, and differing in outward physical appearance only by its more viscous nature, the first small clot is not readily distinguishable from the blood itself.

Some improvement in detection was effected by slowly tilting the blood sample from end to end in the tube and watching for a more viscous particle to form. Here again, however, a small clot could readily sluice back and forth with the main body of blood without being seen.

It is therefore an object of the present invention to provide an apparatus for readily and accurately detecting the formation of the first clot in a blood sample.

It it another object of the invention to provide an apparatus of the nature described which is very inexpensive and which therefore can be discarded after a single use.

It is a further object of the invention to provide a method of determining the activated coagulation time of whole blood which is simple, reliable, sensitive, and convenient.

It is an additional object of the invention to provide a generally improved apparatus for detecting the coagulation of whole blood and a generally improved method of determining the activated coagulation time of whole blood.

Other objects, together with the forgoing, are attained in the techniques and embodiments described in the following description and illustrated in the accompanying drawing in which:

FIGURE 1 is a median sectional view showing the device in a horizontal attitude;

FIGURE 2 is a transverse sectional view, to an enlarged scale, the plane of the section being indicated by the line 2—2 in FIGURE 1;

FIGURE 3 is a view similar to FIGURE 1 but with the device inclined in one direction;

FIGURE 4 is a view comparable to FIGURE 3 but showing the device inclined in the other direction;

FIGURE 5 is a view comparable to that of FIGURE 2, but showing a variant form of foraminous member;

FIGURE 6 illustrates another form of foraminous member; and,

FIGURE 7 shows yet another form of foraminous member.

While the method of the invention can be practiced in various ways, and the apparatus can physically be embodied in a variety of forms, depending upon the circumstances and requirements of use, the techniques described and the devices set forth herein have been tested and used with eminently satisfactory results.

It is to be noted that while the present specifications relate for the most part to the coagulation of whole blood, the apparatus and method also lend themselves generally to the detection of a change in state from liquid to solid.

The apparatus of the invention, generally designated by the reference numeral 12, includes an elongated transparent vessel 13. The vessel is preferably a conventional test tube, in the interests of economy and convenience.

In customary fashion, one end 14 of the test tube is sealed off whereas the other, open end 16, is selectively closed by a stopper 17, the stopper including a neck plug 18 and a finger grip 19.

Extending along the central axis 21 of the tube 13 is a wire 22 supported along its length by a pair of transverse, foraminous members 23 and 24 arranged in a spaced, parallel relation and pierced centrally by the wire 22, to which the foraminous members are secured.

The foraminous members are secured inwardly from the ends of the tube, being located in a central zone intermediate the ends. Preferably, in fact, the foraminous members are so arranged as to divide the tube into three substantially equal chambers, or portions, viz. a stopper portion 27, a middle portion 28 and an end portion 29.

If desired, one end of the wire 22 can be mounted on the neck plug 18.

The foramainous members 23 and 24 can be fabricated from a variety of materials and can assume a wide choice of configurations, variant forms being shown in FIGURES 5–7 and being generally designated, respectively, by the reference numerals 31, 32 and 33.

In the case of foraminous members 23 and 24, shown most clearly in FIGURES 1 and 2, the pair is conveniently fabricated from a mesh screen of a fairly coarse mesh, the screen being formed to a circular-in-plan shape, with a diameter substantially equal to the inner diameter of the tube.

The varient member 31 is formed from a thin circular sheet provided with a plurality of suitably dimensioned openings 36; the member 32, from a substantially helically wound pancake of fine wire 37; and the member 33, from a star-shaped array of wires 38.

The purpose of the foraminous members, regardless of configuration, is to provide a structure which is sufficiently permeable to allow the free flow of liquid, such as a sample of whole blood 41, between the three chambers, but which also affords a sufficiently webbed framework against which even a small particle 42 (see FIGURE 4) of solid or viscous material, such as a blood clot will become lodged, and thereby be readily detected by the observer.

In performing the process of the invention, a predetermined quantity of blood, for example, 2 mls. is drawn from a patient by venipuncture, and directed by suitable technique into an evacuated 12 mm. diameter test tube having disposed therein 4–64 mg. of diatomaceous earth. Preferably, the method is carried out under conditions of uniform temperature, such as 37° C.

The timer is started at this juncture.

The stopper 17 is thereupon promptly inserted and the test tube is inverted a few times in order to mix the blood thoroughly with the diatomite particles 44 which serve as matrices, or seeds, to effect quick and maximal contact activation of the blood's plasma content and thereby assist clotting.

The situation at this point is as appears most clearly in FIGURE 1, with the particulate particles 44 intermixed with the blood 41.

Alternate slow tilting, or inclining, of the test tube is thereupon effected, as shown in FIGURES 3 and 4, causing the liquid sample to move from one end of the test tube to the other, and to pass through the foraminous members 23 and 24 as flow occurs from the stopper chamber 27, through the middle chamber 28 and into the end chamber 29, and vice versa.

Prior to formation of the first clot, the fluid flows freely through the screens 23 and 24, and there is no sign of solid or viscous particles on the screens. However, upon the formation of the first clot 42, shown in this instance as having formed in the chamber 27, the mesh will filter the clot 42 and, as shown in FIGURE 4, the clot 42 lodges against the adjacent surface of the confining screen and can readily be observed as the balance of the liquid flows into the remote end chamber 29.

It is to be noted that the first clot can form when the blood sample is located in any of the three chambers, and that the screens 23 and 24 present four sides against which the first clot can lodge.

Upon observing the first clot 42 which lodges on one of the screen surfaces, the timer is stopped.

The elapsed time affords a valuable indication of certain types of coagulation defects.

While the foregoing procedure relates for the most part to manipulation of the tube by hand, and to visual observation of the formation of the first clot, it will also be recognized that suitable tube tilting mechanism could be utilized, and that other means of detecting clot formation, such as photo-electric and gravimetric devices, could be employed.

It has been found, however, that using the above-described apparatus and technique affords a reliable, sensitive, accurate and reproducible result.

What is claimed is:
1. Apparatus for detecting the coagulation of whole blood comprising:
(a) an elongated transparent vessel having a first end and a second end separated by an intermediate zone;
(b) means for closing said ends; and
(c) a foraminous member mounted transversely within said vessel in said intermediate zone, said foraminous member being capable of freely passing a freshly drawn sample of whole blood therethrough and of preventing the movement therethrough of a coagulated blood particle exceeding a predetermined size.

2. An apparatus as in claim 1 wherein said vessel is a test tube sealed at said first end.

3. An apparatus as in claim 2 wherein said end closing means includes a stopper removably disposed in said second end.

4. An apparatus as in claim 2 including an axial wire extending through said intermediate zone, and wherein said foraminous member is disposed on said wire in radial symmetry with respect to said wire.

5. An apparatus as in claim 4 comprising a pair of said transverse foraminous members mounted on said axial wire in spaced, parallel relation, said members being located within said intermediate zone.

6. An apparatus as in claim 5 wherein said foraminous members are spaced apart to form three substantially equal chambers within said tube.

7. An apparatus as in claim 6 wherein said foraminous members are fabricated from a screen mesh of predetermined mesh size and configuration.

8. A method of determining the coagulation time of whole blood comprising the steps of:
(a) drawing from a patient a predetermined quantity of whole blood;
(b) introducing the blood sample into an elongated transparent vessel having a predetermined capacity in excess of the blood quantity, the vessel including intermediate the ends a foraminous member substantially spanning the cross section of the vessel;
(c) mixing the blood with a predetermined quantity of particulate material possessing a large surface area to effect maximal contact activation of the plasma content of the blood;
(d) tilting the vessel alternately about a transverse axis to effect movement of the blood through the foraminous member; and
(e) timing the appearance of the first blood clot lodged upon the foraminous member.

9. The method of claim 8 further characterized by maintaining the temperature of the vessel and the blood at substantially 37° C. until appearance occurs.

References Cited

UNITED STATES PATENTS 2,616,796   11/1952   Schilling et al. _____ 23—253

OTHER REFERENCES

Macht, D. I., et al., Science 115, #2978, pp. 91–92, January 1952.

MORRIS O. WOLK, Primary Examiner

R. M. REESE, Assistant Examiner

U.S. Cl. X.R.

23—252; 73—64.1